United States Patent [19]
Gregg

[11] Patent Number: 5,743,473
[45] Date of Patent: Apr. 28, 1998

[54] APPARATUS FOR CRUSHING GLASSWARE

[76] Inventor: John Michael Gregg, 6545 Churchill Dr., Huntington Beach, Calif. 91648

[21] Appl. No.: 761,732

[22] Filed: Dec. 5, 1996

[51] Int. Cl.⁶ ................................................. B02C 19/14
[52] U.S. Cl. ........................ 241/33; 241/95; 241/99; 241/100; 241/101.3; 241/264
[58] Field of Search ........................ 241/99, DIG. 14, 241/100, 36, 33, 283, 262, 264, 95, 101.3, 84.3

[56] References Cited

U.S. PATENT DOCUMENTS

| | | |
|---|---|---|
| 2,190,971 | 2/1940 | Boedeker . |
| 3,623,672 | 11/1971 | De Frank . |
| 3,913,849 | 10/1975 | Atanasoff et al. . |
| 4,545,540 | 10/1985 | Nakamura . |
| 4,579,287 | 4/1986 | Brown . |
| 4,655,404 | 4/1987 | Deklerow . |
| 5,042,724 | 8/1991 | Perry . |
| 5,205,497 | 4/1993 | Deklerow . |
| 5,328,106 | 7/1994 | Griffin ................................. 241/99 |

FOREIGN PATENT DOCUMENTS

| | | |
|---|---|---|
| 4-200754 | 7/1992 | Japan . |
| 5-220417 | 8/1993 | Japan . |
| 852357 | 8/1981 | U.S.S.R. . |

*Primary Examiner*—Mark Rosenbaum
*Attorney, Agent, or Firm*—Fulbright & Jaworski

[57] ABSTRACT

An apparatus for crushing and storing product, especially glassware such as fluorescent lights and mercury vapor lamps, which when crushed, produces injurious substances, particularly mercury compounds, broken glass, and phosphorous powder. A flat funnel depending from a crushing chamber communicates with a round drum lid that has an opening coterminous with the narrow end of the flat funnel, so that crushed product is directed to the drum. A suction source is connected via the drum, through an opening in the lid, to the funnel-shaped compartment.

10 Claims, 3 Drawing Sheets

APPARATUS FOR CRUSHING GLASSWARE

BACKGROUND OF THE INVENTION

This invention relates to an apparatus and method for safely crushing, storing and filtering any resulting debris from products, particularly unwanted glassware. In particular, the glassware includes fluorescent lights, thermometers and mercury vapor lamps which contain injurious substances, particularly mercury (Hg) compound and phosphorous powder. If someone inhales mercury vapor on the occasion of destruction of the glassware his health will be adversely affected. If such broken products are discarded, mercury compound can be diffused into the air from open-air dump yards and landfills. In particular, on the occasion of a strong wind, a great amount of fine glass particles and floating mercury can be emitted into the air and accumulate in human bodies through the respiratory organs.

Furthermore, it can be appreciated that crushing such glassware for reducing its volume is considerably dangerous, so that it often hurts a worker or even a passerby. In addition, storing used glassware in a factory or office causes great inconvenience and anxiety.

The present invention is directed to the safe crushing, storing and disposal of such glassware, especially fluorescent bulbs which are typically 4-foot or 8-foot long tubes, each containing 30 to 40 ng of mercury. These tubes are difficult to handle as a waste because of their lengths and inherent brittleness. Most facilities which use large numbers of fluorescent tubes find it beneficial to minimize bulk waste by breaking them. However, when the bulbs are broken, the tubes implode and a fine dust of phosphorous powder with mercury is released. The phosphorous powder, broken glass and mercury pose a significant safety hazard to personnel. The present invention provides an apparatus and method for breaking and storing the tubes, while filtering away the resulting phosphorous powder, mercury vapor and fine glass particles. Preferably a vacuum is used to direct the mercury vapor and phosphorous powder through a filter. The apparatus of the present invention is preferably operated manually. It is simple, durable and cost-effective.

SUMMARY OF THE INVENTION

The present invention provides a solution for the foregoing difficulties by providing an apparatus for crushing unwanted products containing injurious substances wherein the products are of elongated shape while permitting connection to a standard storage drum, e.g. a 55 gallon drum. The apparatus maintains the substances admitted or powder produced within the apparatus and can further be used to store the crushed unwanted product for a time before transferring the product to a reutilization plant or to a landfill.

The shape of the apparatus is significant. It includes a relatively rectangular top box section to contain crusher blades, and a lower flat funnel section which decreases in length to a narrow end forming, in shape, when viewed inverted, a truncated flat funnel compartment having a linearly extended base. The narrow end of the funnel compartment is secured, e.g. by welding, to a round lid that fits over the top of the drum and which has a rectangular opening coterminous with the narrow end of the flat funnel compartment. The opening is therefore rectangular in shape. The lid can be placed over the open end of the drum and secured by a clamping flange. The lid is also formed with a hose opening which communicates with a canister to provide vacuum suction and filtering via the drum to the funnel compartment.

DETAILED DESCRIPTION OF THE INVENTION

Figure 1:
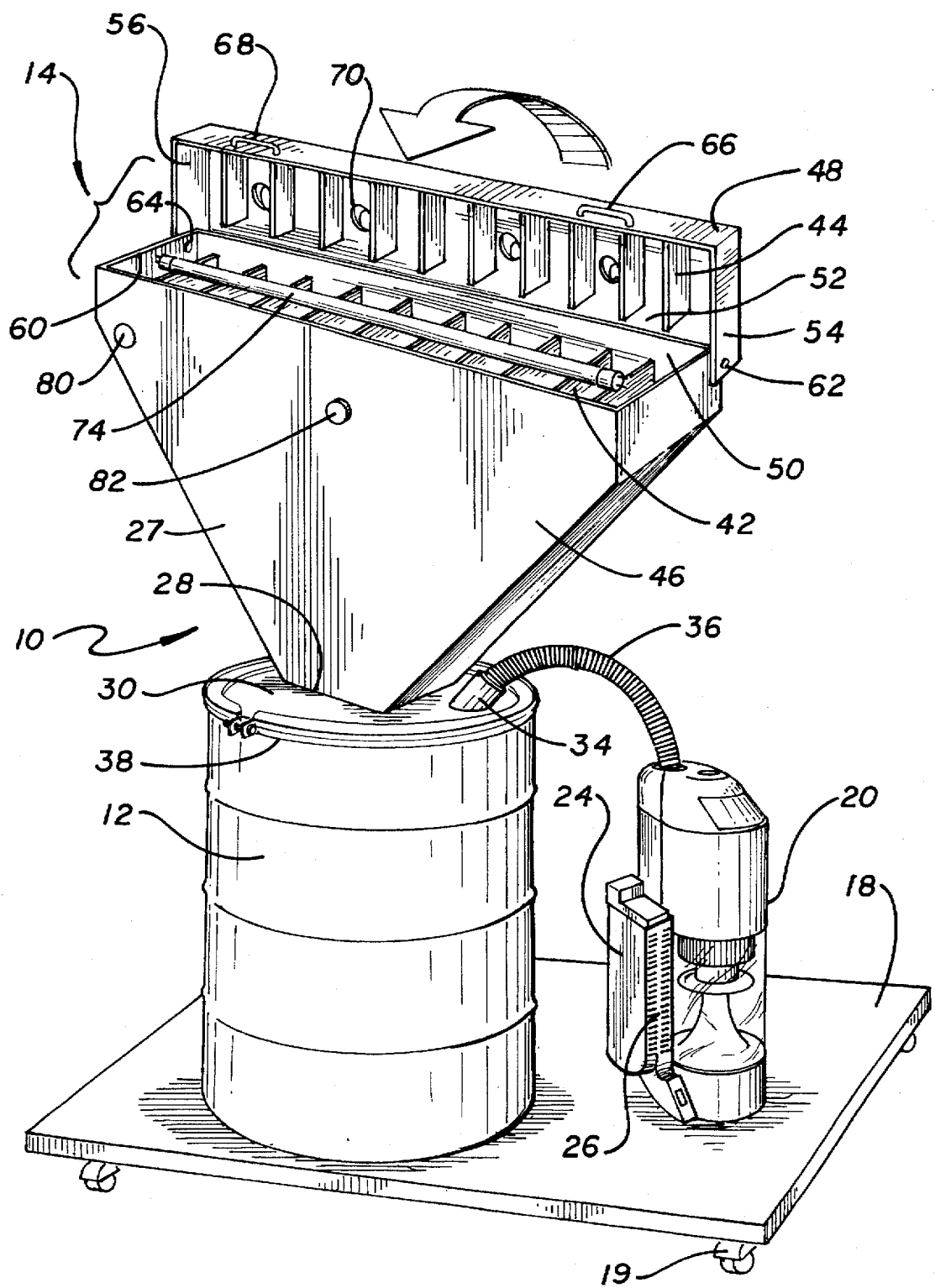
FIG. 1 is a perspective view of the glassware crushing apparatus of the present invention, in open position.
Figure 2:
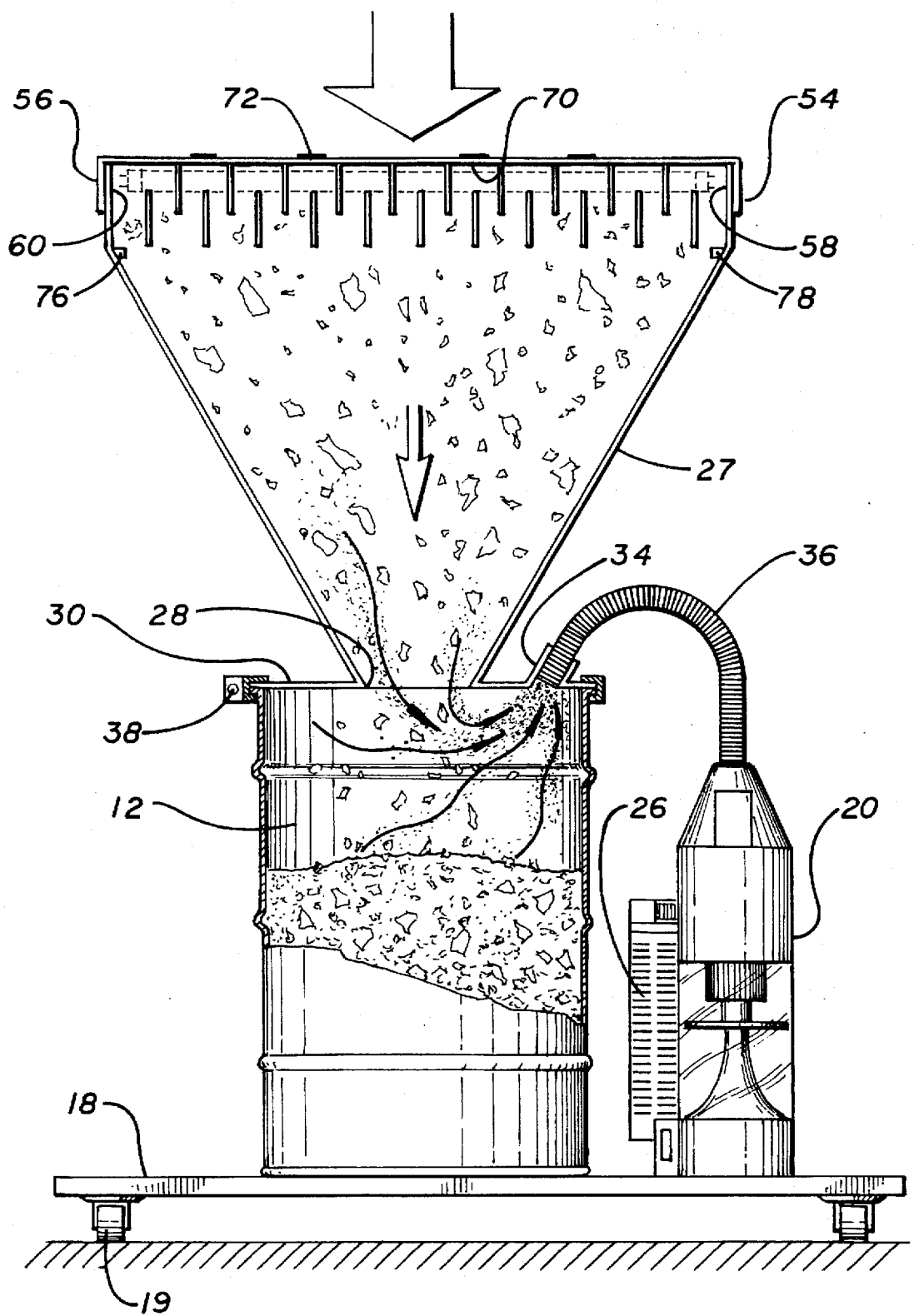
FIG. 2 is an elevational, partly cross-sectional view of the apparatus of FIG. 1, in closed position.

Referring to FIGS. 1 and 2, there is shown a crushing and storing apparatus for unwanted products, in particular, unwanted products that produce injurious substances when crushed and/or stored. For example, the apparatus is useful for crushing and storing glassware and/or containers which contain injurious substances such as mercury. Thus, examples of the unwanted products include glassware such as fluorescent bulbs, thermometers and mercury vapor lamps. The apparatus includes a housing 10 for accommodating the unwanted products, a storage drum 12 serving as a receptacle for receiving the unwanted products, a crusher 14 for crushing them, a suction vacuum filtering unit 20 driven by a motor (not shown), and having an adsorbent filter 22 (which in this embodiment is a HEPA filter) for removing dust such as phosphorous powder resulting from crushing fluorescent bulbs, and adsorbing injurious substances such as mercury compound, and an outlet portion 26 for exhausting ventilating air. Any commercial vacuum filtering unit can be used. In a specific embodiment, the unit is a Fantom® vacuum cleaner which has a cyclone separation unit and HEPA output filter. The vacuum cleaner unit is obtainable from Fantom Technologies, Buffalo, N.Y.

The configuration of the housing 10 enables the crusher to be used with an ordinary storage drum 12, such as a 55 gallon drum, making it conveniently accessible to small facilities. The storage drum 12 and vacuum filtering unit 20 are both supported on a platform 18 which is on casters 19 and which enables the apparatus to be easily moved. As shown more particularly in FIG. 1, the housing has a lower compartment 27 which has a truncated flat funnel shape narrowing from the top portion thereof down to its bottom end 28 where it is connected to a drum lid 30 that fits over the drum. The top of the funnel-shaped compartment 27 continues upwardly as a rectangular chamber 32. When viewed inverted, the shape is of a truncated flat funnel having a linearly extended base.

The drum lid 30 is formed with an opening coterminous with the bottom end 28 of the flat funnel compartment 27 and has adjacent thereto a further opening which is formed with an upright 34 to receive the input end of a flexible vacuum tubing 36, which tubing 36 is connected to the vacuum filtering unit 20.

The upright 34 and the bottom end 28 of the funnel-shaped compartment 27 are secured, e.g., by welding, to the drum lid 30. The drum lid 30 is secured to the top of the drum 12 by having placed therearound a common circular clamping flange 38 so that the drum is airtight except for the upright 34 and compartment end 28.

Figure 3:
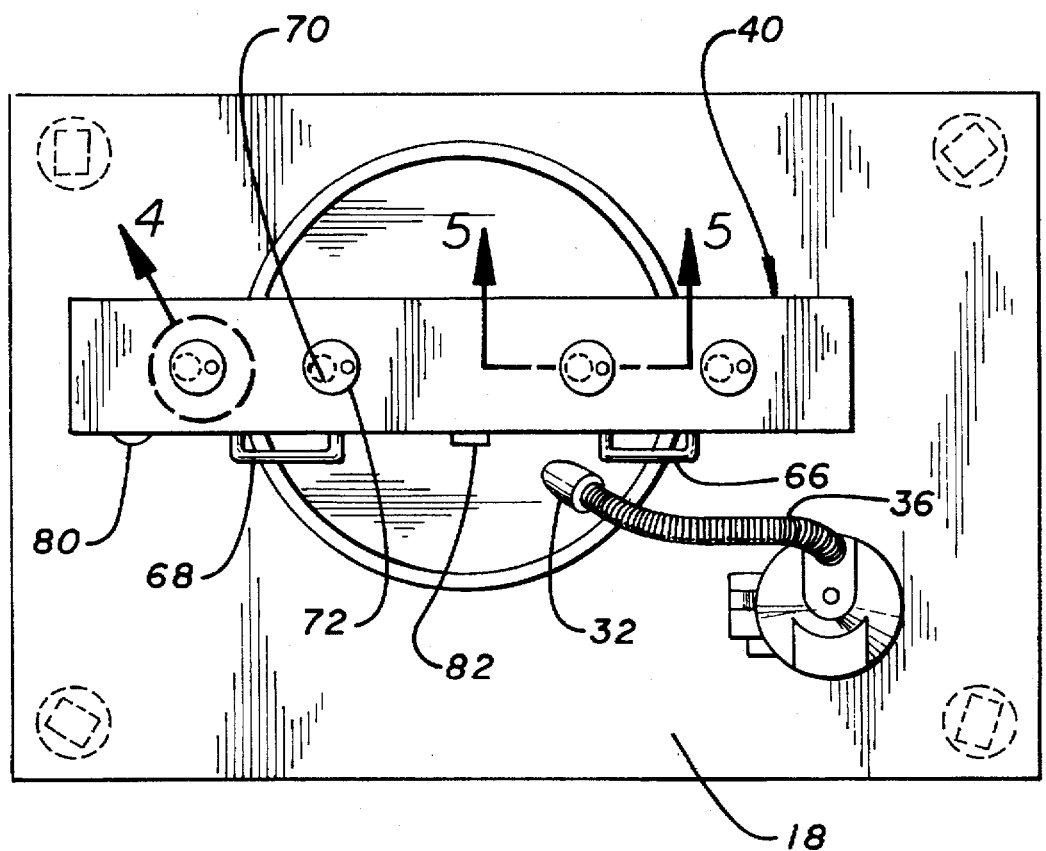
FIG. 3 is a top plan view of the apparatus of FIG. 2.
Figure 4:
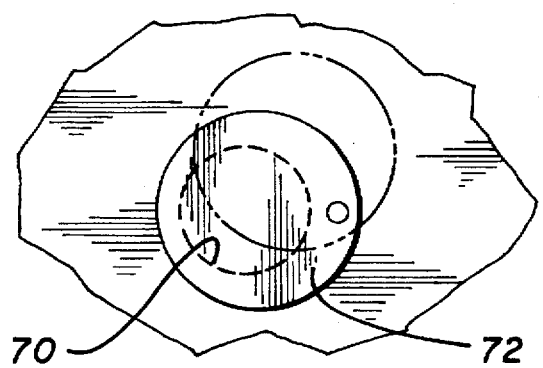
FIG. 4 is a detailed view of a portion of FIG. 3 showing an air vent lid in closed position, and in open position in shadow.
Figure 5:
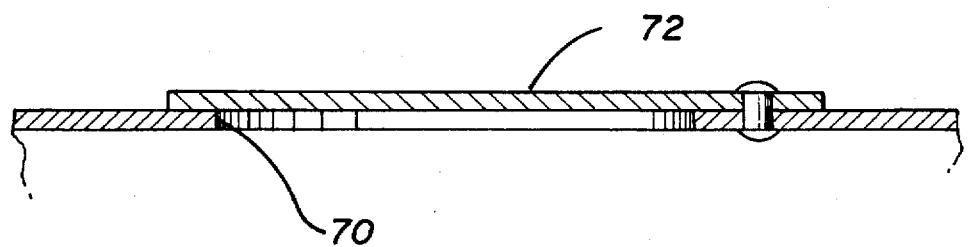
FIG. 5 is a cross-sectional view taken on line 5—5 of FIG. 3, of the closed air vent.

Referring additionally to FIGS. 3–5, the crusher 14 is formed of the rectangular chamber 32 and a chamber lid 40. The chamber 32 and chamber lid 40 each contain a plurality of fixed blades, respectively 42 and 44, which extend crosswise respectively from the front walls 46 and 48 and rear walls 50 and 52 of the chamber 32 and chamber lid 40. The chamber lid 40 has side walls 54 and 56 and is rotatably secured at the rear of side walls 58 and 60 of the chamber 32 by pivot pins 62 and 64. A pair of handles 66 and 68 facilitate closing the lid. As shown in FIG. 2, respective fixed blades 42 and 44 are offset so as to at least partially overlap when the chamber lid 40 is closed onto the chamber 32. The chamber lid 40 is formed with at least one air vent 70 (four are used in this embodiment), each equipped with a rotatable flap 72 to control the degree of venting.

In a preferred embodiment of the invention, the apparatus is used to crush and store fluorescent bulbs. Thus, a fluorescent light bulb 74 is placed horizontally in the chamber 32 on top of the fixed blades 42. Only one bulb 74 is shown but the apparatus can accommodate more than one fluorescent bulb, between one to four 96-inch fluorescent bulbs, or between one to eight 48-inch fluorescent bulbs. The chamber lid 40 is then closed to crush the bulbs 74. Plug portions at both ends of the fluorescent light are crushed at the same time.

The apparatus is manually operated. The crushing operation is performed in the housing 10 isolated from the outside environment, so that an operator cannot be hurt and no injurious, substance is diffused into the air. The broken bulb pieces fall into the drum 12 and are stored therein.

As shown in FIG. 2, in consequence of the crushing operation of the fluorescent bulbs, the internal space of the compartment 27 becomes filled with fine pieces of broken glass, phosphorous powder, mercury vapor, and other injurious substances suspended in air therein. These particles are forced into the drum 12, by means of the suction action of the vacuum filtering unit 20. The adsorbent filter 22 is capable of filtering out such waste as vaporized liquids such as mercury, suspended solids such as dust, broken glass, and phosphorous powder. Clean air, after having passed through the filter 22, is exhausted through the outlet portion 28 into the air. When the drum 12 is filled with broken pieces of the fluorescent bulbs and waste, it is detached from the apparatus, covered with an ordinary drum lid, and transferred to a reutilization plant or to a landfill.

The apparatus can be provided with an infrared light 76 and a sensor 78 for detecting the presence, by opacity, of the gaseous, liquid or solid waste resulting from crushing of the fluorescent bulbs, such as vaporized mercury or suspended solids. The vacuum filtering unit 20 motor shuts off when the sensor 78 indicates that the gaseous, liquid or solid waste resulting from crushing of the fluorescent bulbs, such as such as vaporized mercury or suspended solids have been reduced to a predetermined minimal level inside the housing 10.

A light bulb 80 electrically connected to the sensor 78 or vacuum 20, turns on to indicate when it is safe to open the chamber lid 40 to begin another cycle of light bulb crushing. While FIG. 1 shows specific locations for the infrared light 76 and sensor 78, they can be located in any position convenient or maximized for the detection of the vaporized liquid mercury or suspended solids. Other instruments can be used, such as an ultraviolet photometer. See, for example, U.S. Pat. No. 4,655,404, the disclosure of which is incorporated herein by reference.

The apparatus further includes a motion detector 82 equipped with or connected to a switch which turns on the apparatus when it senses the presence or approach of an operator. While FIG. 1 shows a specific location for the motion detector 82, it can be placed at any location convenient or maximized for the detection of the approach or presence of an operator.

While there have been shown and described preferred embodiments, it is to be understood that various other adaptations and modifications may be made within the skill of the art for use with particular applications, without departing from the spirit and scope of the invention.

I claim:

1. An apparatus for crushing a product which produces injurious substances upon crushing, comprising:

a housing for accommodating the product including a chamber for receiving the product;

means operable in said chamber for crushing the product comprising a plurality of blades in said chamber and a lid for said chamber containing a plurality of blades which are closeable onto product placed in said chamber, thereby crushing said product;

a flat funnel compartment depending from said chamber having a wide end on said chamber and a narrow end distal therefrom, the wide end being integral with the chamber;

a lid for a storage drum integral with the narrow end of said flat funnel and having an opening therethrough coterminous with the narrow end of said flat funnel; and an opening in said drum lid through which a source of suction can be applied.

2. The apparatus of claim 1, including a drum for storing crushed product, said drum lid being secured to seal said storage drum.

3. The apparatus of claim 2, wherein said lid is manually operated.

4. The apparatus of claim 1, comprising a filter for removing injurious substances from air, and means for directing air from said drum through said filter.

5. The apparatus of claim 4, comprising a sensor for detecting said injurious substances, said sensor being connected to said source of suction such as to turn off the suction source when the injurious substances reach a predetermined level in said housing.

6. The apparatus of claim 5, further comprising a light bulb connected to said sensor or to said suction source, said light bulb being turned on when said sensor senses that injurious substances reach said predetermined value.

7. The apparatus of claim 4, wherein said filter comprises an adsorbent to absorb the injurious substances from the air.

8. The apparatus of claim 1, wherein said chamber lid is formed with at least one closeable vent opening.

9. The apparatus of claim 1, wherein said apparatus comprises a motion detector which turns on the apparatus when it senses the presence or approach of an operator.

10. An apparatus for crushing a product which produces injurious substances upon crushing, comprising:

a housing for accommodating the product including a chamber for receiving the product;

means operable in said chamber for crushing the product;

a flat funnel compartment depending from said chamber having a wide end at said chamber and a narrow end distal therefrom;

said crushing means comprising a plurality of blades in said chamber and a lid for said chamber containing a plurality of blades offset from said chamber blades at least partially overlapping said chamber blades, and which are closeable onto product placed in said chamber when said lid is closed on said chamber, thereby crushing said product;

a storage drum;

a lid for said storage drum, sealing said storage drum, said drum lid being integral with the narrow end of said flat funnel and having an opening therethrough coterminous with the narrow end of said flat funnel;

a source of suction; and an opening in said drum lid through which said source of suction can be applied.

* * * * *